(12) United States Patent
Kaneko et al.

(10) Patent No.: US 9,395,672 B2
(45) Date of Patent: Jul. 19, 2016

(54) IMAGE FORMING APPARATUS HAVING MULTIPLE PAPER FEEDING PATHS

(71) Applicant: CANON KABUSHIKI KAISHA, Tokyo (JP)

(72) Inventors: Daisuke Kaneko, Suntou-gun (JP); Ichiro Yasumaru, Mishima (JP); Atsushi Ogata, Mishima (JP); Kazushi Ino, Suntou-gun (JP); Hiroshi Kato, Odawara (JP); Tomoyuki Iwakoshi, Suntou-gun (JP); Masaru Aoki, Numazu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/565,748

(22) Filed: Dec. 10, 2014

(65) Prior Publication Data

US 2015/0098742 A1 Apr. 9, 2015

Related U.S. Application Data

(63) Continuation of application No. 14/252,982, filed on Apr. 15, 2014, now Pat. No. 8,964,271.

(30) Foreign Application Priority Data

Apr. 25, 2013 (JP) .................. 2013-092114

(51) Int. Cl.
*G03G 15/00* (2006.01)
*G06K 15/16* (2006.01)
*G03G 21/16* (2006.01)
(Continued)

(52) U.S. Cl.
CPC .......... *G03G 15/6529* (2013.01); *B65H 29/125* (2013.01); *B65H 85/00* (2013.01); *G03G 15/602* (2013.01); *G03G 21/1604* (2013.01); *G03G 21/1647* (2013.01); *G06K 15/16* (2013.01); *B65H 2301/33312* (2013.01); *B65H 2403/422* (2013.01); *B65H 2403/724* (2013.01); *B65H 2403/942* (2013.01); *B65H 2405/3322* (2013.01); *B65H 2801/06* (2013.01);
(Continued)

(58) Field of Classification Search
CPC . G03G 15/6529; G03G 15/602; B65H 85/00; G06K 15/16
USPC .......................................... 358/498; 399/367
See application file for complete search history.

(56) References Cited

U.S. PATENT DOCUMENTS 5,369,480 A * 11/1994 Isobe ........................... 358/401
6,382,614 B1 5/2002 Fukatsu et al.
(Continued)

FOREIGN PATENT DOCUMENTS

JP 05-289575 * 11/1993
JP 2006-232467 A 9/2006

*Primary Examiner* — Eric A Rust
(74) *Attorney, Agent, or Firm* — Fitzpatrick, Cella, Harper & Scinto

(57) ABSTRACT

An image forming apparatus includes a first conveying path guiding a sheet such that the sheet passes through the image forming portion, a second conveying path guiding the sheet on which the image is formed by the image forming portion to the first conveying path. A document is fed to the second conveying path and the image forming apparatus includes a first drive transmission portion transmitting a drive force to the image forming portion and a second drive transmission portion transmitting the drive force to a document feeding portion, a conveyance portion and a document discharge portion.

13 Claims, 11 Drawing Sheets

(51) Int. Cl.
*B65H 29/12* (2006.01)
*B65H 85/00* (2006.01)

(52) U.S. Cl.
CPC .. *B65H2801/39* (2013.01); *G03G 2215/00928* (2013.01); *G03G 2221/1657* (2013.01)

(56) References Cited

U.S. PATENT DOCUMENTS

| | | | |
|---|---|---|---|
| 6,637,996 B1 | 10/2003 | Hayakawa et al. | |
| 6,826,374 B2 | 11/2004 | Kato et al. | |
| 6,973,285 B2 | 12/2005 | Sekiyama et al. | |
| 6,997,449 B2 | 2/2006 | Obuchi et al. | |
| 7,011,306 B2 | 3/2006 | Kato et al. | |
| 7,050,751 B2 | 5/2006 | Watanabe et al. | |
| 7,597,311 B2 | 10/2009 | Kawata et al. | |
| 7,753,368 B2 | 7/2010 | Sekiyama et al. | |
| 7,874,558 B2 | 1/2011 | Ogata et al. | |
| 8,038,147 B2 | 10/2011 | Ogata et al. | |
| 8,061,712 B2 | 11/2011 | Tsuji et al. | |
| 8,434,753 B2 | 5/2013 | Fukatsu et al. | |
| 8,720,886 B2 | 5/2014 | Kuroda et al. | |
| 8,964,271 B2 * | 2/2015 | Kaneko et al. | 358/498 |
| 2010/0149605 A1 * | 6/2010 | Kim | 358/474 |
| 2011/0292414 A1 * | 12/2011 | Nagappan | 358/1.9 |
| 2012/0025455 A1 | 2/2012 | Tsuji et al. | |
| 2012/0229837 A1 * | 9/2012 | Kubo | 358/1.13 |
| 2013/0277909 A1 | 10/2013 | Ino | |
| 2013/0293909 A1 | 11/2013 | Endo et al. | |
| 2014/0320939 A1 | 10/2014 | Ogata | |
| 2014/0327921 A1 | 11/2014 | Ogata | |

* cited by examiner

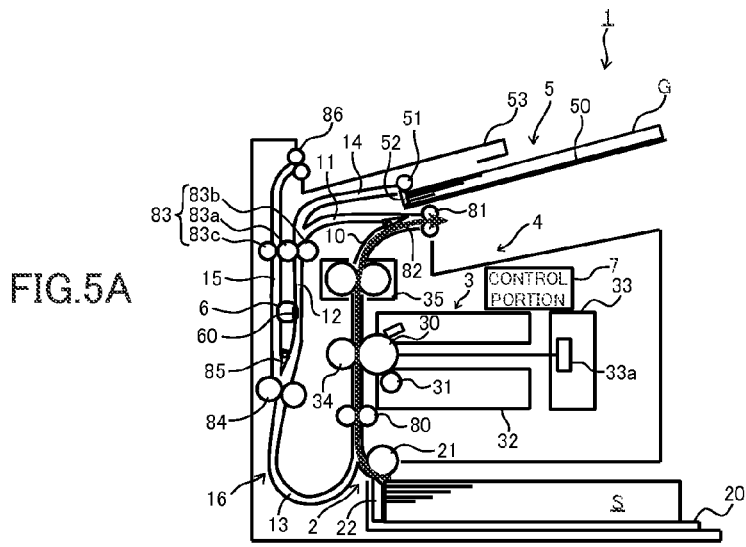
FIG.5A
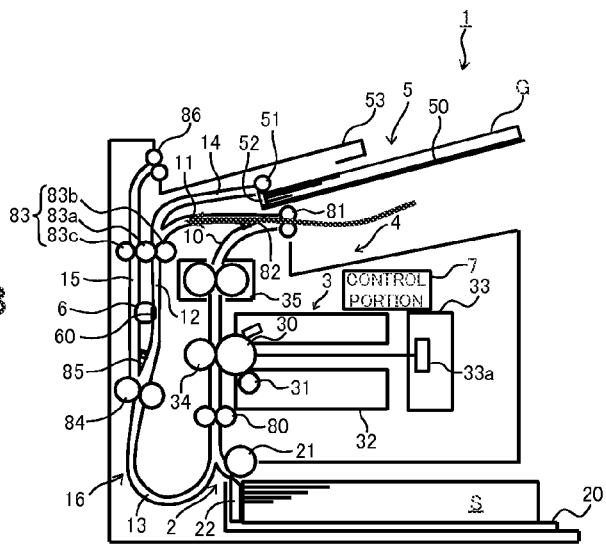
FIG.5B
FIG.5C

IMAGE FORMING APPARATUS HAVING MULTIPLE PAPER FEEDING PATHS

BACKGROUND OF THE INVENTION

1. Field of the Invention

The present invention relates to an image forming apparatus that is capable of reading an image of a document.

2. Description of the Related Art

In the related art, an image forming apparatus is known which includes an automatic document feeder (ADF) that is capable of automatically feeding a document to an image reading portion when an image that is read in the image reading portion capable of reading the image of the document is formed on a sheet.

Recently, in the image forming apparatus, demand for downsizing is strong. However, since, in the image forming apparatus including the automatic document feeder, generally, a document conveying path that is configured to convey the document and a sheet conveying path that is configured to convey the sheet are provided individually, and there is a problem in that downsizing is difficult.

Thus, an image forming apparatus is proposed in JP-A-2006-232467, which achieves the downsizing by using a common part of a part of a document conveying path of the automatic document feeder and a part of a sheet conveying path of an image forming apparatus body.

SUMMARY OF THE INVENTION

According to a first aspect of the present invention, there is provided an image forming apparatus including a sheet feeding portion configured to feed a sheet, an image forming portion configured to form an image on the sheet while conveying the sheet, a first conveying path configured to guides the sheet fed from the sheet feeding portion such that the sheet passes through the image forming portion, a second conveying path configured to guides the sheet on which the image is formed by the image forming portion to the first conveying path, a document feeding portion configured to feed a document to the second conveying path, an image reading portion configured to read the image of the document fed by the document feeding portion, a conveyance portion configured to convey the document fed by the document feeding portion and the sheet which passes through the image forming portion and on a first surface of which the image is formed in the second conveying path, a document discharge portion configured to discharge the document from which the image is read by the image reading portion, a first drive transmission portion configured to transmit a drive force from the drive portion to the image forming portion, a second drive transmission portion configured to transmit the drive force of the drive portion to the document feeding portion, the conveyance portion and the document discharge portion, and a control portion configured to control the first drive transmission portion and the second drive transmission portion.

According to second aspect of the present invention, there is provided an image forming apparatus including a first drive system having a sheet feeding portion that feeds a sheet, an image forming portion that forms an image on the sheet fed from the sheet feeding portion, a sheet discharge portion that discharges the sheet on which the image is formed by the image forming portion, and a first drive transmission portion that transmits the drive to the sheet feeding portion, the image forming portion and the sheet discharge portion, a first conveying path which forms a conveyance route of the sheet from the sheet feeding portion to the sheet discharge portion and in which the image forming portion is disposed on the route thereof, a second conveying path that connects an upstream portion and a downstream portion of the image forming portion in a conveyance direction of the sheet on the first conveying path, and has a common conveying path through which the sheet on a first surface of which the image is formed by the image forming portion and the document pass, an image reading portion that is disposed to be capable of reading the image of the document conveyed on the common conveying path, and a second drive system which has a document feeding portion that feeds the document, a conveyance portion that conveys the document or the sheet on the common conveying path, a document discharge portion that discharges the document conveyed through the common conveying path and a second drive transmission portion that transmits the drive to the document feeding portion, the conveyance portion and document discharge portion, and in which the document feeding portion, the conveyance portion and the document discharge portion are capable of independently transmitting the drive with the first drive system.

Further features of the present invention will become apparent from the following description of exemplary embodiments with reference to the attached drawings.

BRIEF DESCRIPTION OF THE DRAWINGS

FIG. 5A is a view illustrating a conveyance state of a sheet in the printer according to the first embodiment and illustrating the sheet that is conveyed to a sheet conveying path.

FIG. 5B is a view illustrating a conveyance state of the sheet in the printer according to the first embodiment and illustrating the sheet that is switchback-conveyed by a pair of sheet discharge rollers.

FIG. 5C is a view illustrating a conveyance state of the sheet in the printer according to the first embodiment and illustrating the sheet joining the sheet conveying path through a U-turn conveying path.

DESCRIPTION OF THE EMBODIMENTS

Hereinafter, an image forming apparatus according to an embodiment of the invention is described with reference to the drawings. The image forming apparatus according to the embodiment of the invention is an image forming apparatus including an image reading device capable of reading image information of a document such as copier, a printer, a facsimile and a multifunction machine thereof.
In the following embodiment, as the image forming apparatus, description is given using an electrophotographic type laser beam printer (hereinafter, referred to as "printer").

First Embodiment

A printer 1 according to a first embodiment of the invention is described with reference to FIGS. 1 to 7B.

First, a schematic configuration of an entire printer 1 according to the first embodiment is described with reference to FIGS. 1 to 4.

Figure 1:
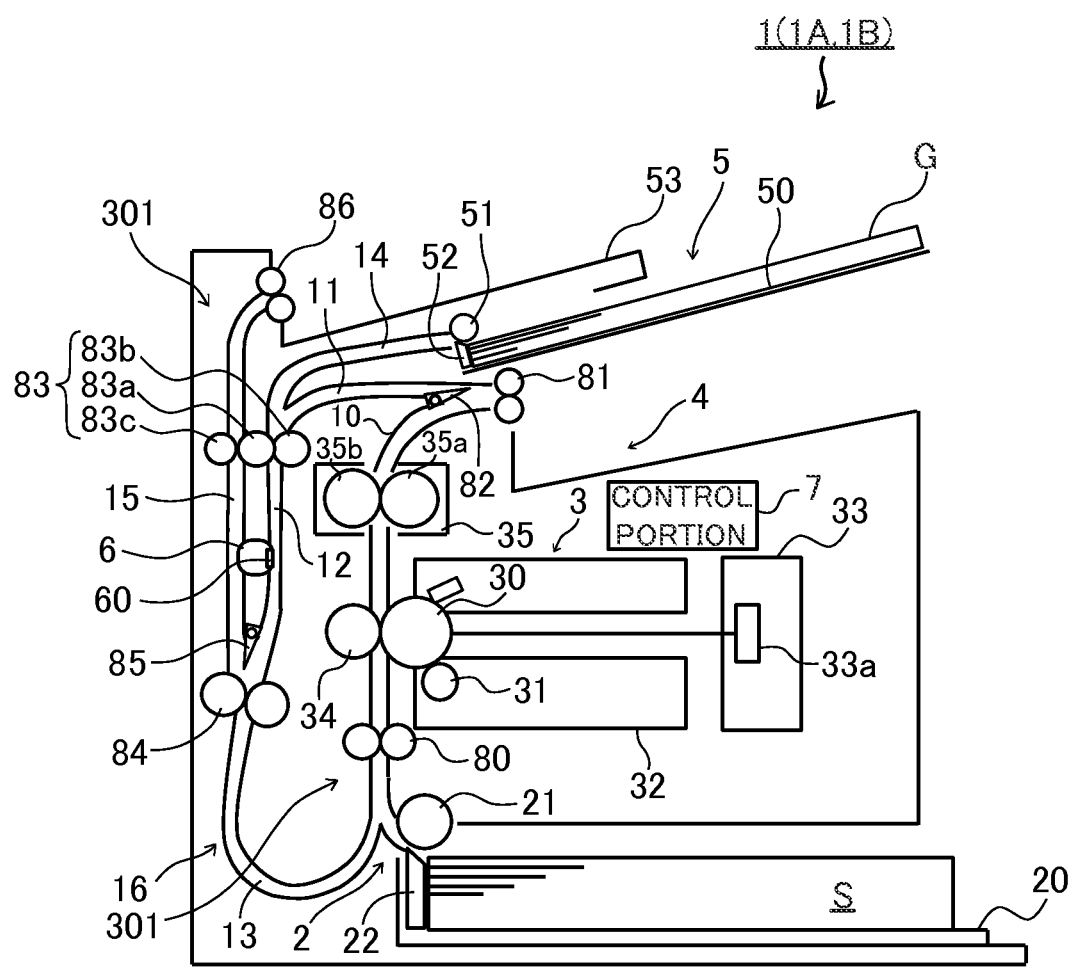
FIG. 1 is a cross-portional view schematically illustrating a printer according to a first embodiment of the invention.

As illustrated in FIG. 1, the printer 1 includes a sheet feeding portion 2 that is positioned in a lower portion of the printer 1, an image forming portion 3 that is positioned above the sheet feeding portion 2, and a sheet stacking portion 4 that is positioned in an upper portion of the printer 1. A sheet on which an image is formed by the image forming portion 3 is discharged to the sheet stacking portion 4 by a pair of sheet discharge rollers 81 (sheet reversing means). Further, the printer 1 includes a document feeding portion 5 that is positioned in the upper portion of the printer 1, an image reading portion 6 that is positioned on the side of the printer 1, and a discharged document stacking portion 53 that is positioned in the upper portion of the printer 1.

Furthermore, the printer 1 includes a sheet conveying path (first conveying path) 10 that is provided between the sheet feeding portion 2 and the pair of sheet discharge rollers 81, and a duplex conveying path (second conveying path) 16 that connects a downstream of the sheet conveying path 10 in a conveyance direction and an upstream of the sheet conveying path 10 in the conveyance direction. The duplex conveying path 16 includes a reverse conveying path 11 that is connected to the downstream of the sheet conveying path 10 in the conveyance direction, a common conveying path 12 that is connected to a downstream end of the reverse conveying path 11, and a U-turn conveying path 13 that connects the downstream end of the common conveying path 12 and the upstream of the sheet conveying path 10 in the conveyance direction.

Further, the printer 1 includes a pair of document discharge rollers (document discharge portion) 86 that discharges the document to the discharged document stacking portion 53. The printer 1 includes a document feeding path 14 that connects a document feeding roller 51 described below and an upstream end of the common conveying path 12, and a document discharge path 15 that connects a connection portion of the common conveying path 12 and the U-turn conveying path 13, and the pair of document discharge rollers 86.

Further, as illustrated in FIGS. 2A to 3B, the printer 1 includes a drive source (drive portion) 200, a first drive transmission portion (first drive transmission mechanism) 210 capable of transmitting drive of the drive source 200 to the sheet feeding portion 2 and the like, and a second drive transmission portion (second drive transmission mechanism) 220 capable of transmitting the drive of the drive source 200 to the document feeding portion 5 and the like.

Further, the printer 1 includes a first electromagnetic clutch 211 (first connection portion, first clutch) capable of contacting and separating the drive source 200 with and from the first drive transmission portion 210, that is, capable of connecting and disconnecting the power transmission between the drive source 200 and the first drive transmission portion 210, a second electromagnetic clutch 221 (second connection portion, second clutch) capable of contacting and separating the drive source 200 with the second drive transmission portion 220, that is, capable of connecting and disconnecting the power transmission between the drive source 200 and the first drive transmission portion 220, and a control portion 7.

In the embodiment, a connection portion (clutch portion) that is configured by the first and second electromagnetic clutches 211, 221 to be capable of blocking power transmission from the drive source 200 to at least one of the first and second drive transmission mechanisms 210, 220 as described above, but the connection portion may be freely configured as long as the drive force can be connected or disconnected. More specifically, the first electromagnetic clutch 211 and the second electromagnetic clutch 221 may be configured of another clutch and, for example, may be configured of a dog clutch or a friction clutch. Further, the drive source 200 may be any one which generates a rotational drive force for an electric motor or the like.

The sheet feeding portion 2 includes a feeding tray 20 that stacks a sheet S, a feeding roller 21 that feeds the sheet S on the feeding tray 20, and a separation portion 22 in which a separation pad (not illustrated) for separating the sheet S fed by the feeding roller 21 one by one is disposed on an upper surface thereof.

The image forming portion 3 includes a process cartridge 32 which is configured by integrating an image forming process portion such as a photoconductive drum 30 as an image carrier or a developing sleeve 31, and an exposure device 33 that radiates a laser beam to the photoconductive drum 30 based on image information. Further, the image forming portion 3 includes a transfer roller 34 that transfers a toner image formed on the photoconductive drum 30 to the sheet S, and a fixing portion 35 that fixes the toner image transferred to the sheet S. The fixing portion 35 includes a heating roller 35a that heats the sheet, and a pressing roller 35b that presses the sheet.

The document feeding portion 5 feeds a document G from a document tray 50 on which the document G that is fed is stacked.

The document feeding portion 5 includes the document feeding roller 51 that sequentially delivers sheets of the document G stacked on the document tray 50 one by one, and a separation portion 52 that separates sheets of the document G fed by the document feeding roller 51 one by one.

The image reading portion 6 includes a reading cover 60 that is configured of a reading sensor (not illustrated) and a transparent member such as glass. The reading sensor is provided inside the image reading portion 6. The reading cover 60 is provided to face the reading sensor and to prevent foreign matter from entering the inside of the image reading portion 6. The image reading portion 6 reads the image of the document G passing through by facing the reading cover 60 by the reading sensor (not illustrated) provided on the inside thereof.

Further, the image reading portion 6 is provided between the common conveying path 12 and the document discharge path 15, and the reading sensor is capable of moving between a first position where the image of the document G passing through the common conveying path 12 is read and a second position where the image of the document G passing through the document discharge path 15 is read. In the embodiment, the image reading portion 6 is rotated by 180 degrees about a rotating shaft (not illustrated) so that the reading sensor is moved.

The sheet conveying path 10 extends upward from the sheet feeding portion 2 so as to pass through a transfer nip configured of the photoconductive drum 30 and the transfer roller 34, and a fixing nip configured of the pressing roller 35b and the heating roller 35a. A pair of conveying rollers (sheet conveyance portion) 80 are provided between the sheet feeding portion 2 and the image forming portion 3 of the sheet conveying path 10. The pair of conveying rollers 80 conveys the sheet S on the sheet conveying path 10. The pair of sheet discharge rollers 81 capable of positively and reversely rotating are provided in the downstream end of the sheet conveying path 10 in the conveyance direction of the sheet. The pair of sheet discharge rollers 81 discharges the sheet S to the outside of the apparatus by being positively rotated. The sheet discharged by the pair of sheet discharge rollers 81 is stacked on the discharged sheet stacking portion 4. When printing the image on both sides of the sheet S, the pair of sheet discharge rollers 81 conveys the sheet S in a direction of the discharged sheet stacking portion 4 by being positively rotated and then conveys the sheet S to the reverse conveying path 11 by being reversely rotated. Further, a first switching member 82 is provided in a branch portion of the sheet conveying path 10 and the reverse conveying path 11. The first switching member 82 guides the sheet S moving in the sheet conveying path 10 to the discharged sheet stacking portion 4 and guides the sheet S that is reversed by the pair of sheet discharge rollers 81 to the reverse conveying path 11 when images are printed on both sides of the sheet S. The reverse conveying path 11 extends toward to the side substantially horizontally.

The common conveying path 12 extends downward and guides the sheet S downward. Duplex conveying triple rollers 83 are provided in the upstream of the common conveying path 12 in the conveyance direction. The duplex conveying triple rollers 83 are configured of a drive roller 83a, a roller 83b and a roller 83c provided on both sides of the drive roller 83a, and have a triple roller-connected configuration by nipping both sides of the drive roller 83a by the roller 83b and the roller 83c with a predetermined pressure. The duplex conveying triple rollers 83 can convey the sheet S and the document G guided to the common conveying path 12 to the downstream (downward in FIG. 1) in the conveyance direction by driving the drive roller 83a. Further, the duplex conveying triple rollers 83 can convey the document G guided to the document discharge path 15 to the downstream (upward in FIG. 1) in a document discharging direction that is the reverse direction of the feeding direction of the document by driving the drive roller 83a.

A second switching member 85 is provided in a branch portion of the common conveying path 12 and the document discharge path 15. The second switching member 85 guides the sheet S or the document G moving in the common conveying path 12 to the U-turn conveying path 13. Further, the second switching member 85 guides the document G moving in the U-turn conveying path 13 in the reverse direction (upward) of the feeding direction of the document to the document discharge path 15.

The U-turn conveying path 13 extends downward and makes a U-turn toward the sheet conveying path 10 in the lower end portion thereof. A pair of duplex conveying rollers (conveyance portion) 84 capable of positively and reversely rotating are provided in the U-turn conveying path 13. The pair of duplex conveying rollers 84 conveys the sheet S or the document G to the U-turn conveying path 13 by being positively rotated, and convey the document G to the document discharge path 15 by being reversely rotated.

The document discharge path 15 extends upward substantially parallel to the common conveying path 12. The pair of document discharge rollers (document discharge portion) 86 is provided in a downstream end of the document discharge path 15. The pair of document discharge rollers 86 discharges the document G to the discharged document stacking portion 53.

Figure 2A:
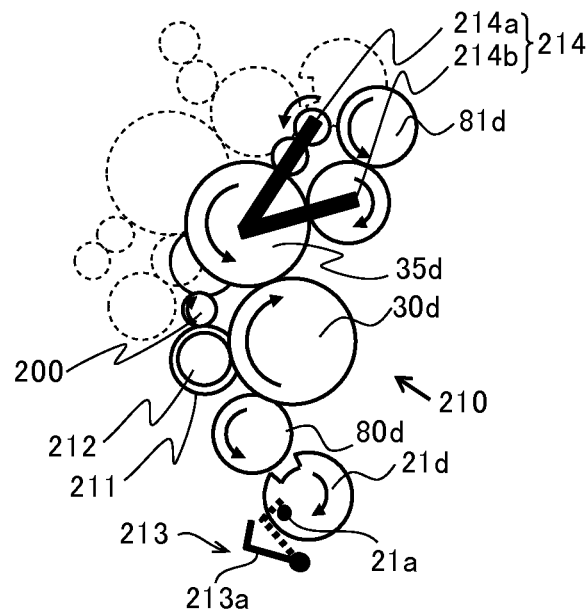
FIG. 2A is a view schematically illustrating a state where a sheet discharge roller gear is reversely rotated in a first drive transmission portion of the printer according to the first embodiment.
Figure 2B:
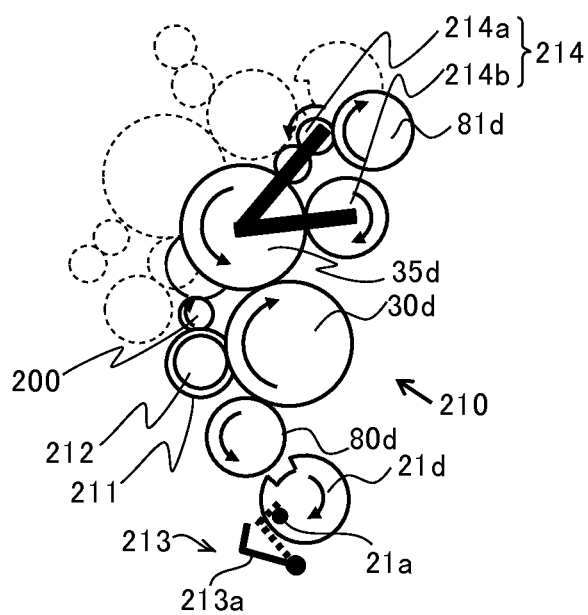
FIG. 2B is a view schematically illustrating a state where a sheet discharge roller gear is positively rotated in the first drive transmission portion of the printer according to the first embodiment.

As illustrated in FIGS. 2A and 2B, the first drive transmission portion 210 includes a first input gear 212 that is connected to the first electromagnetic clutch 211, a photoconductive drum gear 30d that meshes with the first input gear 212, and a conveying roller gear 80d that meshes with the photoconductive drum gear 30d.

Further, the first drive transmission portion 210 includes a feeding roller gear 21d that meshes with the conveying roller gear 80d, a first engagement portion 213 that is capable of engaging with a protrusion portion 21a of the feeding roller gear 21d, and a pressing roller gear 35d that meshes with the photoconductive drum gear 30d. Further, the first drive transmission portion 210 includes a sheet discharge roller gear 81d that is capable of connecting to the pressing roller gear 35d, and a first rotation switching mechanism 214 that switches a rotation direction of the sheet discharge roller gear 81d when connecting to the pressing roller gear 35d.

The photoconductive drum gear 30d is connected to the photoconductive drum 30 and rotates the photoconductive drum 30.

The photoconductive drum 30 is rotated so that the sheet S is conveyed to the transfer nip with the transfer roller 34. The conveying roller gear 80d is connected to one of the pair of conveying rollers 80 and rotates the pair of conveying rollers 80 in the conveyance direction of the sheet. The feeding roller gear 21d is connected to the feeding roller 21 and rotates the feeding roller 21 in the feeding direction of the sheet. The feeding roller gear 21d is configured of a nicked gear having a toothless portion in which a part of consecutive teeth is cut away. The first engagement portion 213 includes a rotatable engagement member 213a. When the toothless portion faces the conveying roller gear 80d, the engagement member 213a of the first engagement portion 213 engages with the protrusion portion 21a so that the rotation of the feeding roller gear 21d is regulated.

The pressing roller gear 35d is connected to the pressing roller 35b and rotates the pressing roller 35b. The pressing roller 35b rotates so that the sheet S is conveyed to the fixing nip with the heating roller 35a. The sheet discharge roller gear 81d is connected to one of the pair of sheet discharge rollers 81 and the other roller rotates by being driven so that the pair of sheet discharge rollers 81 is rotated. The first rotation switching mechanism 214 includes a first gear train 214a and a second gear 214b. The first rotation switching mechanism 214 positively rotates (see FIG. 2B) the pair of sheet discharge rollers 81 by meshing the first gear train 214a with the sheet discharge roller gear 81d, and reversely rotates (see FIG. 2A) the pair of sheet discharge rollers 81 by meshing with the second gear 214b.

Figure 3A:
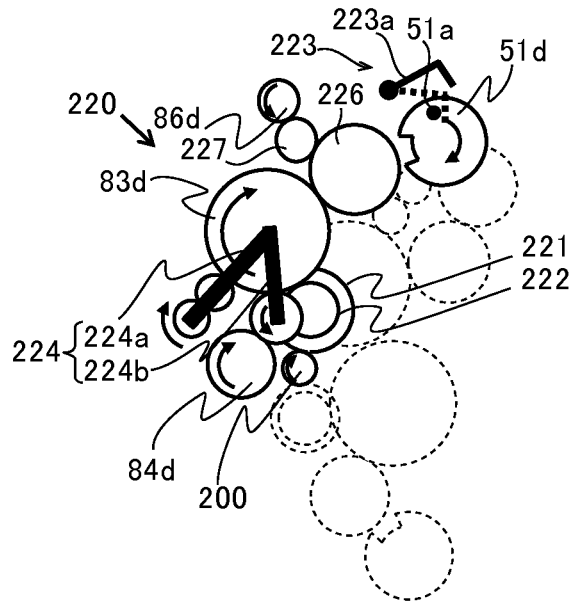
FIG. 3A is a view schematically illustrating a state where a duplex conveying roller gear is reversely rotated in a second drive transmission portion of the printer according to the first embodiment.
Figure 3B:
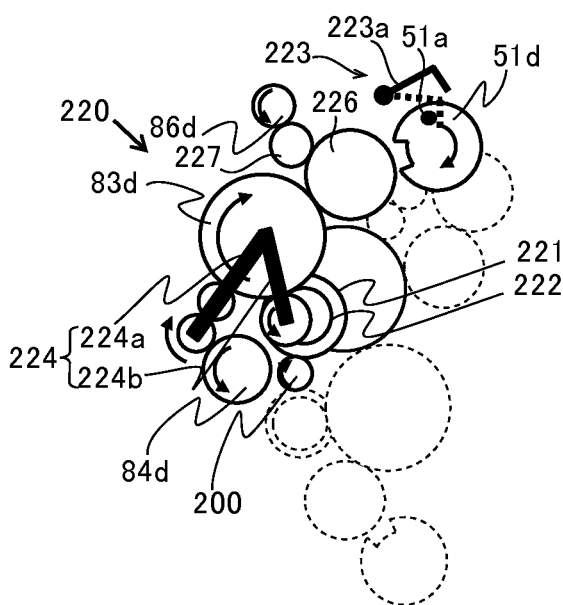
FIG. 3B is a view schematically illustrating a state where the duplex conveying roller gear is positively rotated in the second drive transmission portion of the printer according to the first embodiment.

As illustrated in FIGS. 3A and 3B, the second drive transmission portion 220 includes a second input gear 222 that is connected to the second electromagnetic clutch 221, a drive roller gear 83d that meshes with the second input gear 222, a gear 226 that meshes to the drive roller gear 83d and a document feeding roller gear 51d that is capable of connecting the gear 226. Further, the second drive transmission portion 220 includes a second engagement portion 223 that is capable of engaging with a protrusion portion 51a of the document feeding roller gear 51d, a document discharge roller gear 86d that is connected to the gear 226 through a gear 227, and a duplex conveying roller gear 84d that is capable of connecting the drive roller gear 83d. Further, the second drive transmission portion 220 includes a second rotation switching mechanism 224 that switches the rotation direction of the duplex conveying roller gear 84d when connecting to the drive roller gear 83d.

The drive roller gear 83d is connected to the drive roller 83a of the duplex conveying triple rollers 83 and rotates the duplex conveying triple rollers 83. The document feeding roller gear 51d is connected to the document feeding roller 51 and rotates the document feeding roller 51 in the feeding direction. The document feeding roller gear 51d is configured of a nicked gear having a toothless portion in which a part of consecutive teeth is cut away. The second engagement portion 223 includes a rotatable engagement member 223a.

When the toothless portion faces the gear 226 that meshes with the drive roller gear 83d, the engagement member 223a of the second engagement portion 223 engages with the protrusion portion 51a so that the rotation of the document feeding roller gear 51d is regulated. The document discharge roller gear 86d is connected to one of the pair of document discharge rollers 86 and the other roller is rotated by being driven so that the pair of document discharge rollers 86 is rotated.

The duplex conveying roller gear 84d is connected to one of the pair of duplex conveying rollers 84 and rotates the duplex conveying roller 84. The second rotation switching mechanism 224 includes a first gear train 224a and a second gear 224b. The second rotation switching mechanism 224 positively rotates (see FIG. 3B) the duplex conveying roller gear 84d by meshing the first gear train 224a with the duplex conveying roller gear 84d, and reversely rotates (see FIG. 3A) the duplex conveying roller gear 84d by meshing with the second gear 224b.

Figure 4:
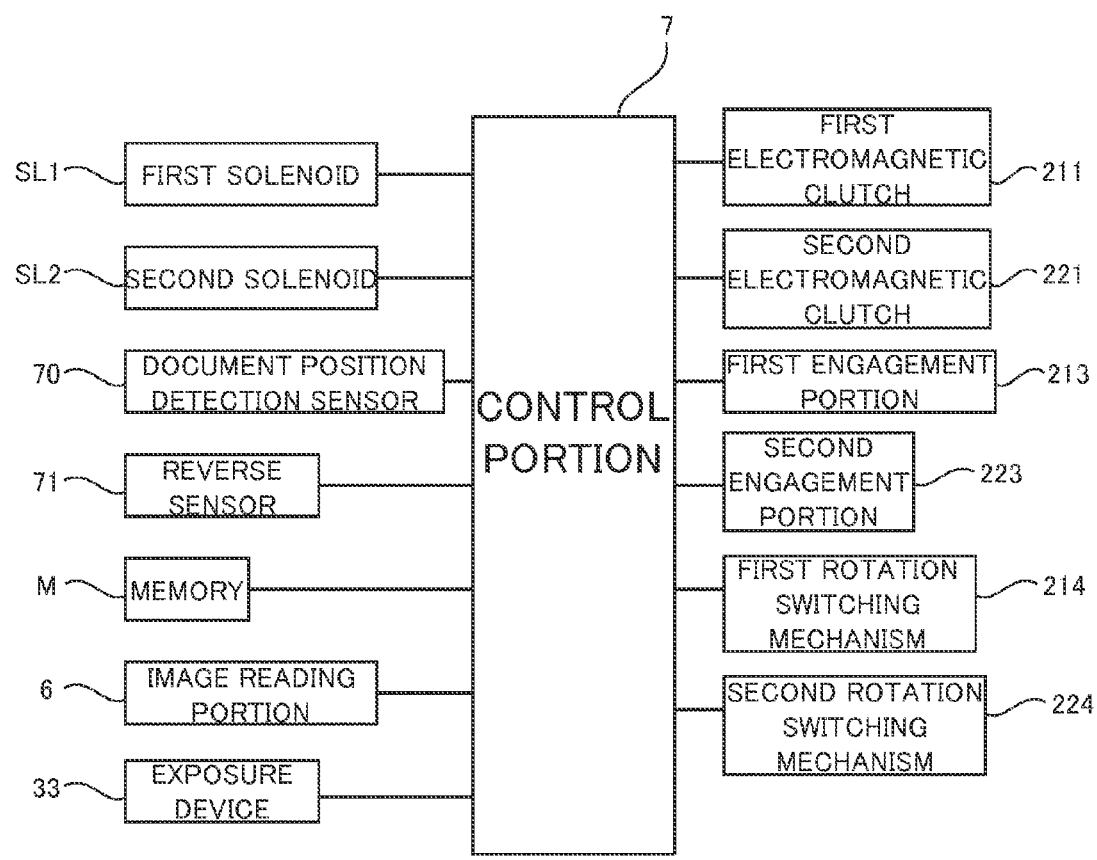
FIG. 4 is a block diagram illustrating a configuration of a control portion of the printer according to the first embodiment.

As illustrated in FIG. 4, a first solenoid SL1 that drives the first switching member 82, a second solenoid SL2 that drives the second switching member 85, a reverse sensor 71 described below, the image reading portion 6, a document position detection sensor 70 described below, and the exposure device 33 are connected to the control portion 7. Further, a memory M that stores the image information of the document G which is read, the first electromagnetic clutch 211, the second electromagnetic clutch 221, the first engagement portion 213, the second engagement portion 223, the first rotation switching mechanism 214, and the second rotation switching mechanism 224 are connected to the control portion 7. The control portion 7 controls the first electromagnetic clutch 211 and the second electromagnetic clutch 221 so that the first drive transmission portion 210 and the second drive transmission portion 220 are operatably configured.

Next, image forming operation (simplex printing and duplex printing) using the printer 1 having the configuration described above is described with reference to FIGS. 5A to 5C.

When receiving a printing signal, first, the control portion 7 controls (ON) the first electromagnetic clutch 211 and then the drive source 200 and the first drive transmission portion 210 are connected to each other. Therefore, a drive force of the drive source 200 is transmitted to the first drive transmission portion 210 and rollers and the like described above which are connected to the first drive transmission portion 210 are driven. At this time, engagement between the engagement member 213a of the first engagement portion 213 and the protrusion portion 21a is released so that the feeding roller 21 rotates to a position in which the teeth portion of the feeding roller 21 meshes with the pair of conveying rollers 80 by a biasing force of a bias member (not illustrated), and the feeding roller 21 is capable of rotating. When the feeding roller 21 rotates, the sheet S on the feeding tray 20 is delivered and the delivered sheets S are separated by the separation portion 22 one by one and then are conveyed toward the image forming portion 3 by the pair of conveying rollers 80.

When a sheet leading end sensor (not illustrated) detects the sheet S, a light emitting portion 33a provided in the exposure device 33 radiates the laser beam to the photoconductive drum 30 that is rotated based on the image information. At this time, the photoconductive drum 30 is uniformly charged with a predetermined polarity and a predetermined potential by a charging roller (not illustrated). Then, when the laser beam is radiated on the photoconductive drum 30 after the surface thereof is charged, an electrostatic latent image is formed on the photoconductive drum 30. The electrostatic latent image is developed by toner supplied from the developing sleeve 31 and then is visualized as a toner image.

When the sheet S reaches the transfer nip, the toner image is transferred to the first surface of the sheet S by an applying bias and a pressure applied to the transfer roller 34. Next, the sheet S is conveyed to the fixing portion 35 and, heat and the pressure are applied to the fixing portion 35. Therefore, the toner image is fixed to the first surface of the sheet S. As illustrated in FIG. 5A, thereafter, the sheet S to which the toner image is fixed is discharged on the sheet stacking portion 4 by the pair of sheet discharge rollers 81. The sheet S discharged on the sheet stacking portion 4 is sequentially stacked on the sheet stacking portion 4. Therefore, the image forming operation of the simplex printing is completed.

Meanwhile, when the images are formed on the both sides of the sheet S, the control portion 7 controls (ON) the second electromagnetic clutch 221 so that the drive source 200 and the second drive transmission portion 220 are connected to each other.

Therefore, the drive force of the drive source 200 is transmitted to the second drive transmission portion 220 and the rollers and the like described above which are connected to the second drive transmission portion 220 are driven. Moreover, ON and OFF of the second electromagnetic clutch 221 may be performed simultaneously with ON of the first electromagnetic clutch 211 and may be ON after the sheet S enters the duplex conveying path 16. Further, at this time, the engagement member 223a of the second engagement portion 223 engages with the protrusion portion 51a so that the rotation of the document feeding roller gear 51d is regulated.

When the reverse sensor 71 (see FIG. 4) detects that the trailing end of the sheet S passes through the branch portion of the sheet conveying path 10 and the reverse conveying path 11, the control portion 7 reversely rotates the pair of sheet discharge rollers 81.

Specifically, the control portion 7 controls the first rotation switching mechanism 214 so that a state (see FIG. 2B) where the first gear train 214a meshes with the sheet discharge roller gear 81d is switched to a state (see FIG. 2A) where the second gear 214b meshes with the sheet discharge roller gear 81d. Further, the control portion 7 drives the first solenoid SL1 so that the first switching member 82 provided in the branch portion is rotated clockwise and then the conveyance direction of the sheet S is switched. As illustrated in FIG. 5B, the sheet S where the image is formed on the first surface thereof by switchback conveyance using the pair of sheet discharge rollers 81 is guided in the reverse conveying path 11 in a substantially horizontal direction and enters the common conveying path 12 with the side of the trailing end until then as the leading side.

As indicated in a dotted line of FIG. 5C, the sheet S entering the common conveying path 12 is conveyed downward along the common conveying path 12 by the drive roller 83a and the roller 83b, and joins the U-turn conveying path 13. As illustrated in a solid line of FIG. 5C, the sheet S that joins the U-turn conveying path 13 makes the U-turn along the U-turn conveying path 13 by the pair of duplex conveying rollers 84 and joins the sheet conveying path 10 between the sheet feeding portion 2 and the image forming portion 3. Therefore, in a state where the sheet S is turned upside down, the sheet S is guided to the pair of conveying rollers 80 again and the image is formed on the second surface by the same operation as when the image is formed on the first surface. The sheet S where the image is formed on the both sides (the first surface and the second surface) is discharged to the sheet stacking portion 4 by the pair of sheet discharge rollers 81. Therefore, the image forming operation of the duplex printing is completed.

Next, image reading operation (duplex reading) using the printer 1 having the configuration described above is described with reference to FIGS. 6A to 7B.

When receiving an image reading signal, first, the control portion 7 controls (ON) the second electromagnetic clutch 221 and then the drive source 200 and the second drive transmission portion 220 are connected to each other. Therefore, a drive of the drive source 200 is transmitted to the second drive transmission portion 220 and rollers and the like described above which are connected to the second drive transmission portion 220 are driven. At this time, engagement between the engagement member 223a of the second engagement portion 223 and the protrusion portion 51a is released so that the document feeding roller 51 rotates to a position in which the teeth portion of the document feeding roller 51 meshes with the gear 226 by a biasing force of a bias member (not illustrated), and the document feeding roller 51 is capable of rotating.

Figure 6A:
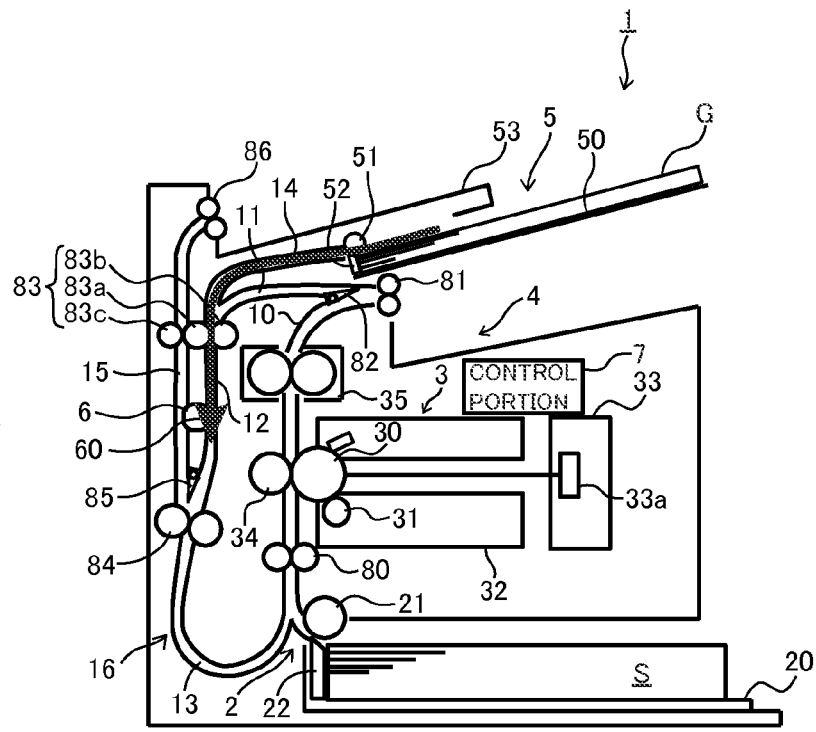
FIG. 6A is a view illustrating a conveyance state of a document in the printer according to the first embodiment and illustrating the document conveyed to a common conveying path.
Figure 6B:
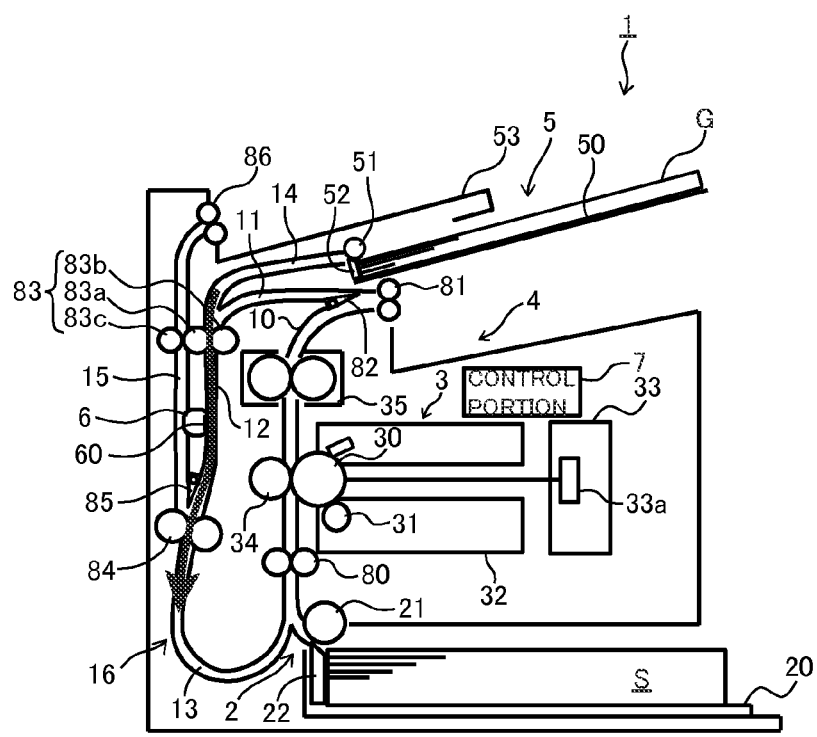
FIG. 6B is a view illustrating the conveyance state of the document in the printer according to the first embodiment and illustrating the document conveyed to the U-turn conveying path.

As illustrated in FIG. 6A, when the document feeding roller 51 rotates, the document G on the document tray 50 is delivered and the delivered sheets of the document G are separated by the separation portion 52 one by one and then is conveyed from the document feeding path 14 to the common conveying path 12. As illustrated in FIG. 6B, the document G conveyed to the common conveying path 12 is conveyed downward along the common conveying path 12 by the drive roller 83a and the roller 83b. At this time, the image reading portion 6 is moved to a first position in which the image of the document G passing through the common conveying path 12 is read. Therefore, the document G passes through the image reading portion 6 so that the image of the first surface of the document G is read. The image information that is read is stored in the memory M (see FIG. 4) as the image information of the first surface of the document G.

Figure 7A:
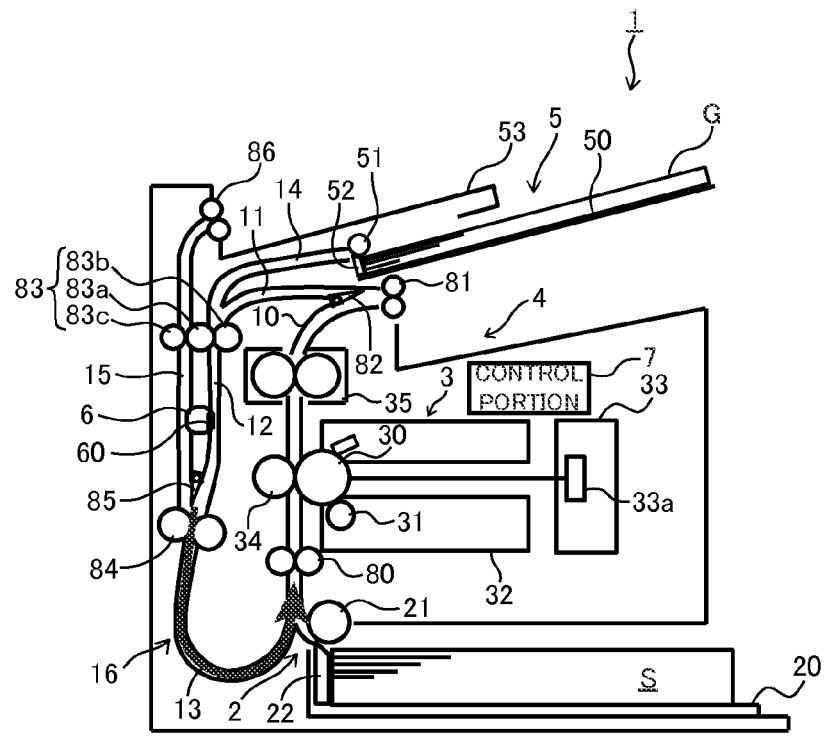
FIG. 7A is a view illustrating the conveyance state of the document in the printer according to the first embodiment and illustrating the document of which a rear end is passed through a second switching member.

As illustrated in FIG. 7A, the document G after passing through the image reading portion 6 is guided to the U-turn conveying path 13 by the second switching member 85 and is conveyed to the U-turn conveying path 13 by the pair of duplex conveying rollers 84. When the document position detection sensor 70 (see FIG. 4) detects that the trailing end of the document G from which the image of the first surface is read passes through the second switching member 85, the control portion 7 reversely rotates the pair of duplex conveying rollers 84. Specifically, the control portion 7 controls the second rotation switching mechanism 224 so that a state (see FIG. 3B) where the first gear train 224a meshes with the duplex conveying roller gear 84d is switched to a state (see FIG. 3A) where the second gear 224b meshes with the duplex conveying roller gear 84d. Further, the control portion 7 drives the second solenoid SL2 so that the second switching member 85 provided in the branch portion is rotated counterclockwise and then the sheet S is switched toward the document discharge path 15. Therefore, the document G is switched back and is conveyed toward the document discharge path 15.

Figure 7B:
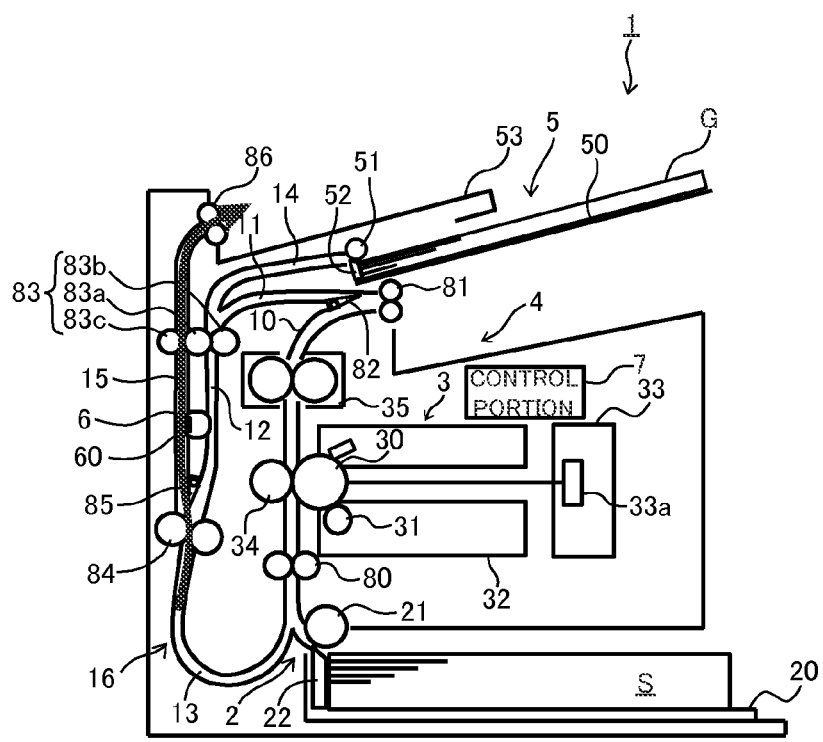
FIG. 7B is a view illustrating the conveyance state of the document in the printer according to the first embodiment and illustrating the document that is reversely conveyed by the pair of duplex conveying rollers, and is guided to a document discharge path.

As illustrated in FIG. 7B, when the document G is switched back, the image reading portion 6 is rotated by 180 degrees from the first position in which the image of the document G passing through the common conveying path 12 is read to the second position in which the image of the document G passing through the document discharge path 15 is read. Therefore, the document G passes through the document discharge path 15 so that the image of the second surface of the document G is read. The imaging information that is read is stored in the memory M (see FIG. 4) as the image information of the second surface of the document G.

The document G after passing through the image reading portion 6 is conveyed upward to the discharged document stacking portion 53 along the document discharge path 15 by the drive roller 83a and the roller 83c. The document G conveyed through the document discharge path 15 is discharged to the discharged document stacking portion 53 by the pair of document discharge rollers 86 that is provided in the downstream end of the document discharge path 15, and is stacked on the discharged document stacking portion 53. Moreover, when reading of the document G is completed, the image reading portion 6 rotates by 180 degrees in preparation for the next document, and is moved to the first position in which the image of the document G passing through the common conveying path 12 again is read. Further, if a user optionally selects the single side reading, it is possible to control the image reading portion 6 so as not to move from the first position to the second position.

Here, if the user selects a copy mode, the image forming operation described above is performed, based on the image information stored in the memory M. Moreover, if the user does not select the copy mode, it is also possible to transmit the image information stored in the memory M to an external computer as electronic data.

As described above, it is possible to downsize the printer 1 by including the common conveying path 12 that is capable of selectively conveying the sheet S and the document G. Further, if the printer 1 performs only the image reading operation, only the second drive transmission portion 220 is operated by controlling (ON) the second electromagnetic clutch 221. Thus, when performing the image reading operation, it is possible to prevent the image forming portion 3 from being driven. Therefore, it is possible to improve durability of the image forming portion 3.

That is, a first drive system (see FIG. 1) 300 is configured to form an image on a first surface of a sheet by a sheet feeding portion 2 that feeds a sheet, an image forming portion 3 that forms an image on the sheet fed from the sheet feeding portion 2, a pair of document discharge rollers (sheet discharge portion) 86 that discharges the sheet on which the image is formed by the image forming portion 3, and a first drive transmission portion (first drive transmission mechanism) 210 that interlocks the sheet feeding portion 2, the image forming portion 3, and the pair of document discharge rollers 86.

Further, a second drive system (see FIG. 1) 301 is configured to convey the sheet and the document on the duplex conveying path (second conveying path) 16 by a document feeding portion 5 that feeds the document, a pair of duplex conveying rollers (conveyance portion) 84 that conveys the document or the sheet on the common conveying path 12, the pair of document discharge rollers (document discharge portion) 86 that discharges the document conveyed through the common conveying path 12, and a second drive transmission portion (second drive transmission mechanism) 220 that interlocks the document feeding portion 5, the pair of duplex conveying rollers 84, and the pair of document discharge rollers 86. In the embodiment, the first and second drive systems 300, 301 are configured to be capable of independently driving.

Further, even in a case where the image forming operation and the image reading operation are performed simultaneously (the sheet S and the document G are present together in the printer), it is possible to reverse or stop the document G without affecting the image forming operation. That is, it is possible to operate the image forming portion 3 without awaiting completion of the reading of the image. Thus, it is possible to improve a degree of freedom of timing in which the image reading and the image forming can be performed and to improve productivity.

Second Embodiment

Next, a printer 1A according to a second embodiment of the invention is described with reference to FIGS. 8A to 10.

The printer 1A according to the second embodiment is different from that according to the first embodiment in that the second drive transmission portion includes a gear shift mechanism capable of accelerating or decelerating a conveyance speed. Thus, in the second embodiment, description is given focusing on points different from that in the first embodiment, that is, on the gear shift mechanism of the second drive transmission portion, and the same reference numeral is attached to the same configuration as that of the printer 1 according to the first embodiment and the description thereof is omitted.

Figure 8A:
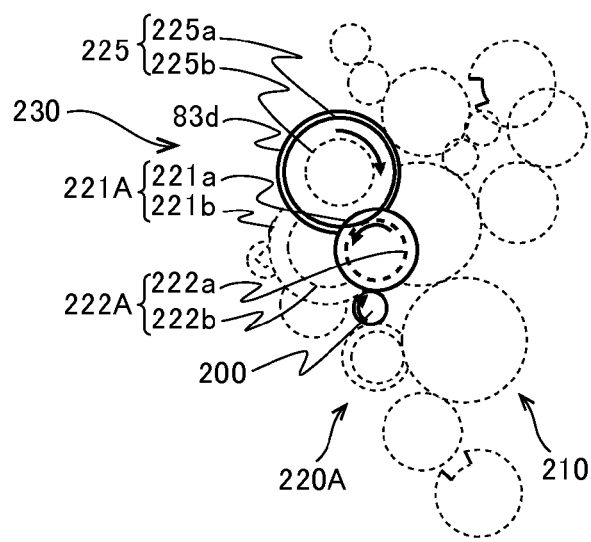
FIG. 8A is a view illustrating a state where a gear shift mechanism selects a first drive route in a second drive transmission portion of the printer according to a second embodiment.
Figure 8B:
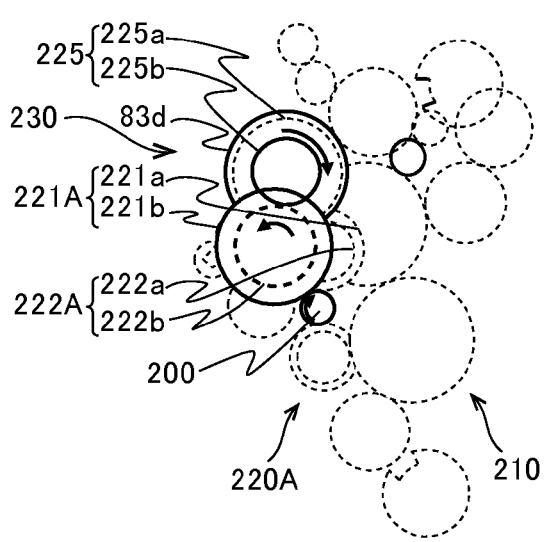
FIG. 8B is a view illustrating a state where a gear shift mechanism selects a second drive route in the second drive transmission portion of the printer according to the second embodiment.

As illustrated in FIGS. 8A and 8B, a gear shift mechanism 230 of a second drive transmission portion 220A of the printer 1A according to the second embodiment is configured to include a second electromagnetic clutch 221A, a second input gear 222A and a drive roller input gear 225. The second electromagnetic clutch 221A includes a clutch gear 221a and a clutch gear 221b, and is configured such that one of the clutch gear 221a and the clutch gear 221b is connected to the drive source 200 or both of them are not connected to the drive source 200. The second input gear 222A includes an input gear 222a that meshes with the clutch gear 221a, and an input gear 222b that meshes with the clutch gear 221b. The drive roller input gear 225 includes a drive roller input gear 225a that meshes with the input gear 222a, and a drive roller input gear 225b that meshes with the input gear 222b. The drive roller input gear 225a and the drive roller input gear 225b are connected to a rotating shaft of a drive roller 83a.

As illustrated in FIG. 8A, if the clutch gear 221a of the second electromagnetic clutch 221A is connected to the drive source 200, a drive force is transmitted from the drive source 200 to the drive roller 83a through the clutch gear 221a, the input gear 222a and the drive roller input gear 225a.

The drive force transmitted to the drive roller 83a is transmitted to each gear described above by the drive roller gear 83d connected to the drive roller 83a and drives the roller and the like connected to each gear.

Similarly, as illustrated in FIG. 8B, if the clutch gear 221b of the second electromagnetic clutch 221A is connected to the drive source 200, the drive force is transmitted from the drive source 200 to the drive roller 83a through the clutch gear 221b, the input gear 222b and the drive roller input gear 225b. The drive force transmitted to the drive roller 83a is transmitted to each gear described above by the drive roller gear 83d connected to the drive roller 83a and drives the roller and the like connected to each gear.

As described above, a transmission route of the drive force from the drive source 200 to the drive roller gear 83d can be switched by a switching operation of the second electromagnetic clutch 221A, and the conveyance speed of the document G can be switched by the roller and the like by switching the transmission route. That is, it is possible to change the conveyance speed of the document G by the roller and the like without changing a rotational speed of the drive source 200.

In the embodiment, if the gear shift mechanism 230 selects (connects to the clutch gear 221a) a first drive route illustrated in FIG. 8A, the conveyance speed of the sheet and the document is set to be an image forming process speed (a first conveyance speed) that is the same as the conveyance speed of the sheet conveyed to the first conveying path 10 by each gear (for example, the pair of duplex conveying rollers 84) that is driven by the drive roller gear 83d.

Further, if the gear shift mechanism 230 selects (connects to the clutch gear 221b) a second drive route illustrated in FIG. 8B, the conveyance speed of the sheet and the document is set to be an image reading process speed (a second conveyance speed) that is slower than the image forming process speed by each gear (for example, the pair of duplex conveying rollers 84) that is driven by the drive roller gear 83d.

For example, the conveyance of the document G from which the image is read and the conveyance of the sheet S in which the image is formed are performed simultaneously, and thus the sheet S and the document G are present together inside the printer. Here, the conveyance speed is changed depending on the performance of the image forming portion and the image reading portion, but, generally, in the printer having an inexpensive structure, the conveyance speed of the reading of a color document is slower than that of the reading of a monochrome document. Thus, when the reading of the monochrome document and the image formation of the sheet are performed simultaneously, the first drive route is selected and the conveyance speed of the document when the monochrome document is read is equal to the image forming process speed. Therefore, the conveyance speed of the sheet or the document is equal in the sheet conveying path 10 and the duplex conveying path 16, and the image forming process where the image is formed on the sheet and the document reading process where the image of the document is read can be performed simultaneously.

Meanwhile, when the reading of the color document and the image formation of the sheet are performed simultaneously, the second drive route is selected when the image of the document is read by an image reading portion 60, and the first drive route is selected when the sheet S is conveyed in the duplex conveying path 16.

Figure 9:
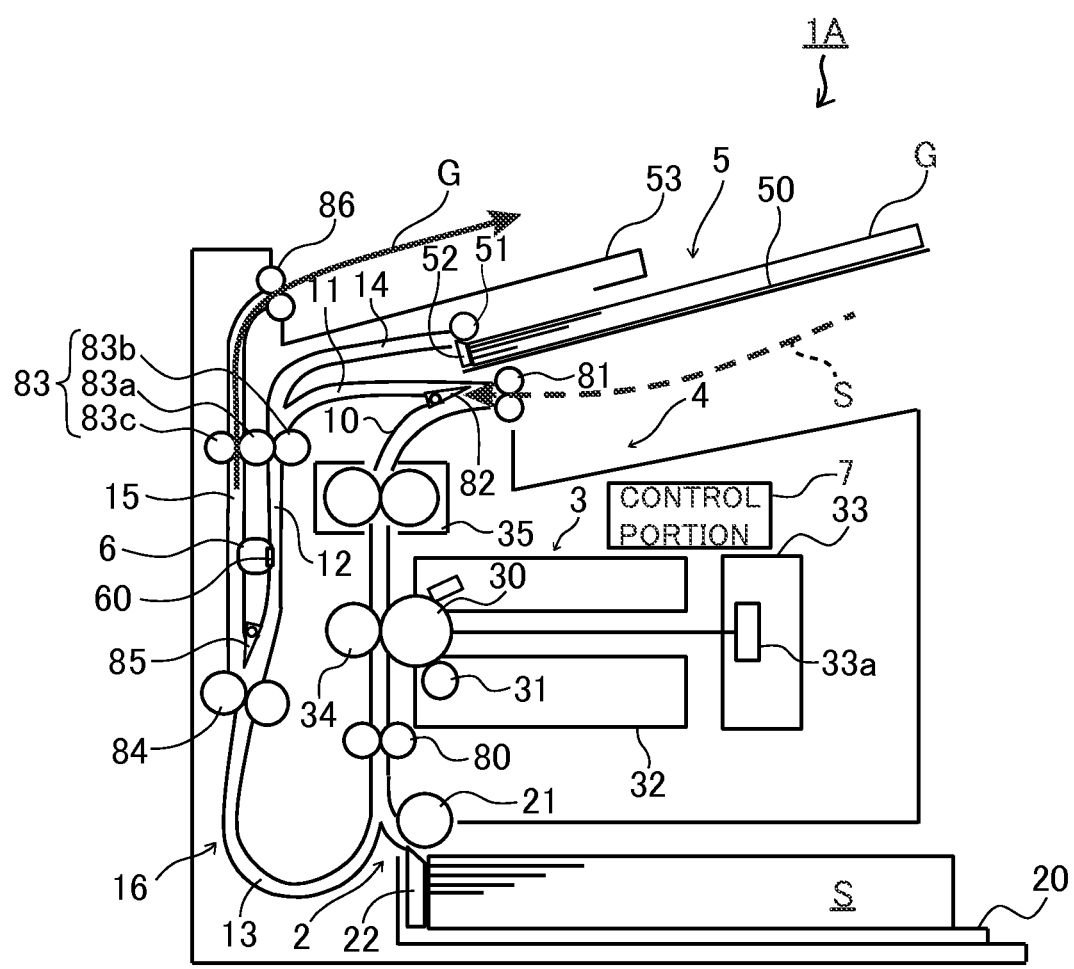
FIG. 9 is a view illustrating a state where the sheet and the document are present together in the printer according to the second embodiment.

Further, even when the reading of the color document is performed, as illustrated in FIG. 9, immediately after the reading of the image of the both sides of the document G is completed, the gear shift mechanism 230 of the second drive transmission portion 220A is switched from the second drive route to the first drive route so that the conveyance speed of the sheet S is changed to the image forming process speed by the second drive transmission portion 220A. Therefore, it is possible to quicken the timing of entry of the sheet S into the duplex conveying path 16.

Figure 10:
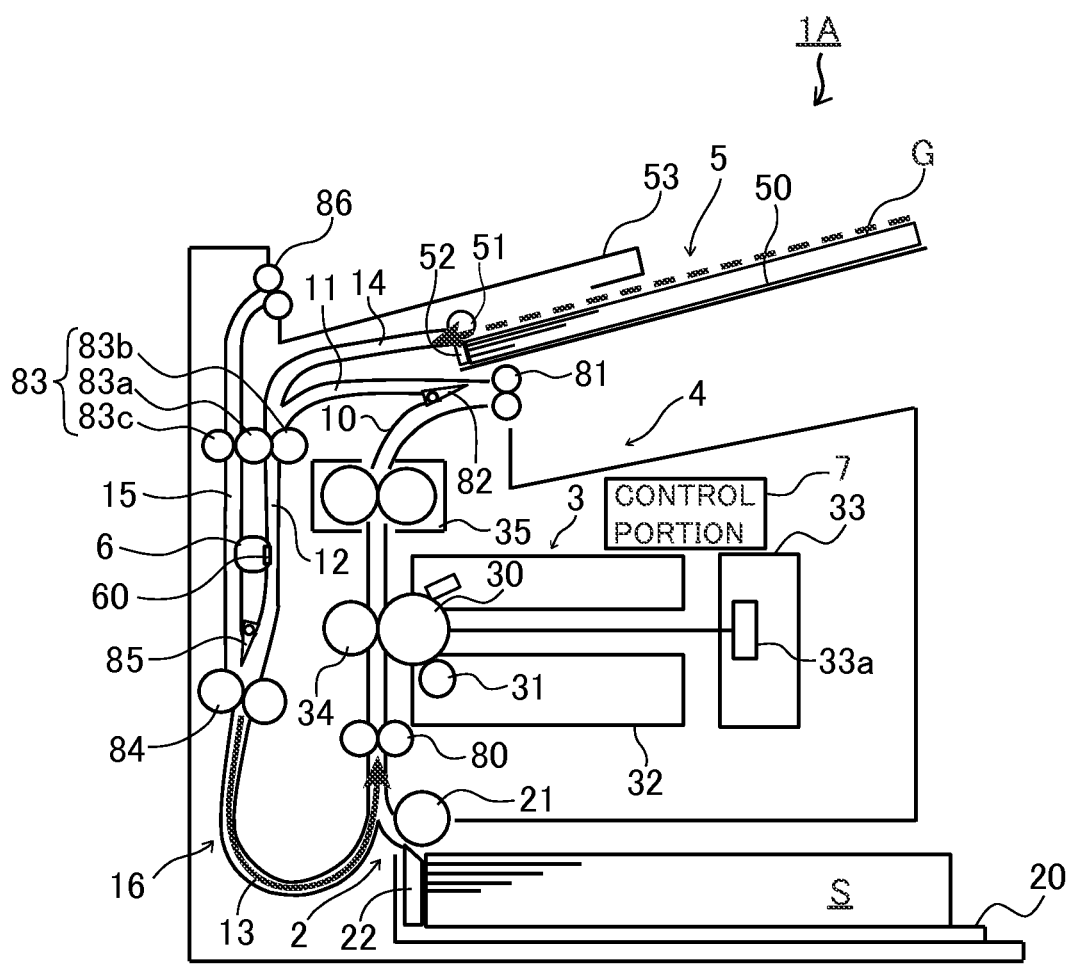
FIG. 10 is a view illustrating a state where the document is in standby without being fed into the printer according to the second embodiment.

Further, as illustrated in FIG. 10, in a case where the document G indicated in a dotted line is standby without being fed while the sheet S indicated in a solid line passes through the duplex conveying path 16, the gear shift mechanism 230 is switched from first drive route to the second drive route so that the conveyance speed of the document G in the duplex conveying path 16 is changed to the image reading process speed. Thus, it is possible to start the feeding of the document G without awaiting completion of the image forming process of the sheet S. Therefore, in the printer 1A, even when the sheet S and the document G are present together inside the printer 1A, it is possible to improve the productivity.

Third Embodiment

Figure 11A:
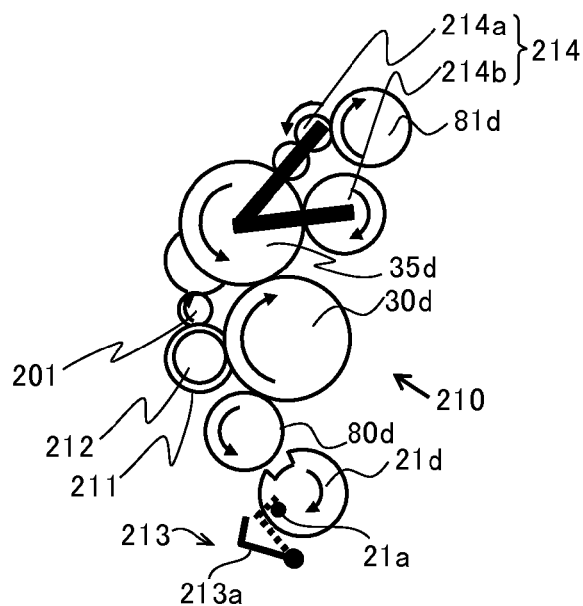
FIG. 11A is a view schematically illustrating a state where a sheet discharge roller gear is positively rotated in a first drive transmission portion of a printer according to a third embodiment.
Figure 11B:
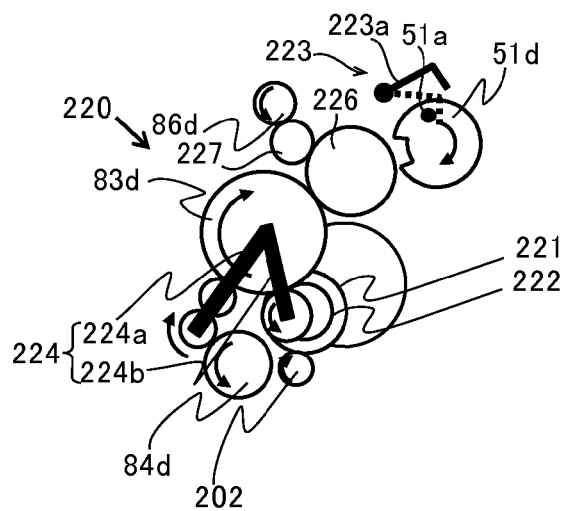
FIG. 11B is a view schematically illustrating a state where a sheet discharge roller gear is positively rotated in a second drive transmission portion of the printer according to the third embodiment.

Next, a printer 1B according to a third embodiment of the invention is described with reference to FIGS. 11A and 11B.

The printer 1B according to the third embodiment is different from that of the first embodiment in that the drive source is configured of two drive sources of a first drive source 201 and a second drive source 202. Thus, in the third embodiment, description is given focusing on points different from that of the first embodiment, that is, on the first drive source 201 and the second drive source 202, and the same reference numerals are attached to the same configuration as the printer 1 according to the first embodiment and the description thereof is omitted.

The first drive source 201 is connected to the first drive transmission portion 210 through the first electromagnetic clutch 211 and is capable of transmitting the drive to the first drive transmission portion 210. The second drive source is connected to the second drive transmission portion 220 through the second electromagnetic clutch 221 and is capable of transmitting the drive to the second drive transmission portion 220. As described above, the first drive transmission portion 210 and the second drive transmission portion 220 switch between the operation and stop independently of each other by providing two drive sources 201 and 202 connected to the first drive transmission portion 210 and the second drive transmission portion 220 independently of each other. Further, drive forces of the first drive source 201 and the second drive source 202 are changed respectively, so that it is possible to independently change the conveyance speed of the sheet or the document that is output when the first drive transmission portion 210 and the second drive transmission portion 220 are operated. Therefore, it is possible to improve the degree of freedom of the timing in which the reading of the image of the document and the image formation on the sheet are capable of being performed and to improve the productivity.

Further, generally, a drive torque required for driving the photoconductive drum 30, the cleaning member, the pressing roller 35b and the heating roller 35a becomes large even if the sheet is simply conveyed due to a sliding resistance generated between the photoconductive drum 30 and the cleaning member, a sliding resistance generated between the pressing roller 35b and the heating roller 35a of the fixing portion 35 or the like. Thus, it is necessary to more increase the drive torque for conveying the sheet inside the sheet conveying path 10 than that of conveying the document to the duplex conveying path 16. Thus, the drive torque (output torque) of the first drive source 201 is set to be greater than that of the second drive source 202.

However, when only the reading of the document is performed without forming the image on the sheet, since the reading of the document can be performed only by the operation of the second drive source 202, the operation of the first drive source 201 that is required for greater torque is not necessary. As a result, it is possible to suppress the supply of the power to the drive source and it also becomes effective from the point of view of a reduction in required power.

Moreover, in the third embodiment, the first electromagnetic clutch 211 and the second electromagnetic clutch 221 are used, but the first drive source 201 may be directly connected to the first drive transmission portion 210 without the first electromagnetic clutch 211 and the second drive source 202 may be directly connected to the second drive transmission portion 220 without through the second electromagnetic clutch 221.

Therefore, it is possible to switch the operation and stop of the first drive transmission portion 210 and the second drive transmission portion 220 independently of each other by turning ON and OFF the first drive source 201 and the second drive source 202.

Further, the conveyance portion is not limited to the pair of duplex conveying rollers 84 and may be one or two or more as long as they are a pair of rollers conveying the sheet and the document on the duplex conveying path 16, and for example, the duplex conveying triple rollers 83 may be the conveyance portion.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application is a Continuation of U.S. application Ser. No. 14/252,982 with a filing date of Apr. 15, 2014, and allowed on Oct. 6, 2014, which claims the benefit of Japanese Patent Application No. 2013-092114, filed on Apr. 25, 2013, which is hereby incorporated by reference herein in its entirety.

What is claimed is:

1. An image forming apparatus, comprising:
a sheet stacking portion on which a sheet is stacked;
an image forming unit configured to form an image on the sheet;

a sheet feeding unit configured to feed the sheet stacked on the sheet stacking portion to the image forming unit;

a sheet discharging unit configured to discharge the sheet on which the image is formed by the image forming unit;

a discharged sheet stacking portion on which the sheet discharged by the sheet discharging unit is stacked;

a document stacking portion on which a document is stacked;

an image reading unit configured to read an image of the document;

a document feeding unit configured to feed the document stacked on the document stacking portion to the image reading unit;

a document discharge unit configured to discharge the document from which the image is read by the image reading unit;

a discharged document stacking portion onto which documents are discharged by the document discharge unit;

a drive unit including at least one drive source; and a control unit configured to control the drive unit such that at least one of the document feeding unit and the document discharge unit is driven in a state in which the image forming unit is not driven, wherein a first conveying path through which the sheet fed by the sheet feeding unit and discharged by the sheet discharging unit passes and a second conveying path through which the document fed by the document feeding unit and discharged by the document discharging unit passes are connected together, wherein the discharged sheet stacking portion, the document stacking portion and the discharged document stacking portion are provided above the image forming unit in a vertical direction, and wherein the discharged sheet stacking portion, the document stacking portion and the discharged document stacking portion are overlapping when viewed in the vertical direction.

2. The image forming apparatus according to claim 1, wherein the control unit controls the drive unit such that at least one of the document feeding unit and the document discharge unit is driven in the state in which the image forming unit is not driven and an image reading mode of reading the image of the document by the image reading unit and discharging the document from which the image is read by the image reading unit from the document discharge unit is executed.

3. The image forming apparatus according to claim 2, wherein the control unit controls the drive unit such that both of the document feeding unit and the document discharge unit are driven in the state in which the image forming unit is not driven.

4. The image forming apparatus according to claim 1, wherein the first conveying path includes a first sheet conveying path that guides the sheet stacked on the sheet stacking portion to the image forming unit and a second sheet conveying path that again guides the sheet on which the image is formed by the image forming unit to the image forming unit, and the second conveying path includes a third conveying path connected to the second sheet conveying path.

5. The image forming apparatus according to claim 4, further comprising a conveyance member provided on the second sheet conveying path and conveying a sheet passed through the first sheet conveying path and a document passed through the third conveying path.

6. The image forming apparatus according to claim 4, wherein the second sheet conveying path branches into a conveying path toward the image forming unit and a conveying path toward the document discharge unit.

7. The image forming apparatus according to claim 1, wherein the drive unit includes a first drive source driving the image forming unit and a second drive source driving the document feeding unit and the document discharge unit.

8. The image forming apparatus according to claim 7, further comprising:

a first clutch that connects/disconnects a power transmission from the first drive source to the image forming unit; and a second clutch that connects/disconnects a power transmission from the second drive source to the document feeding unit and the document discharge unit.

9. The image forming apparatus according to claim 1, wherein the image forming unit includes a photoconductive drum and the drive unit drives the image forming unit by driving the photoconductive drum.

10. The image forming apparatus according to claim 1, wherein the control unit controls the drive unit such that the image forming unit is driven in a state in which the document feeding unit and the document discharge unit are not driven when an image forming mode of forming the image on the sheet fed by the sheet feeding unit by the image forming unit and discharging the sheet on which the image is formed by the image forming unit.

11. An image forming apparatus, comprising:

a sheet stacking portion on which a sheet is stacked;

an image forming unit configured to form an image on a sheet, the image forming unit switchable between a first state for forming the image on the sheet and a second state for not forming the image on the sheet;

a sheet feeding unit configured to feed the sheet stacked on the sheet stacking portion to the image forming unit;

a sheet discharging unit configured to discharge the sheet on which the image is formed by the image forming unit;

a discharged sheet stacking portion on which the sheet discharged by the sheet discharging unit is stacked;

a document stacking portion on which a document is stacked;

an image reading unit configured to read the image of the document;

a document feeding unit configured to feed the document stacked on the document stacking portion to the image reading unit;

a document discharge unit configured to discharge the document from which the image is read by the image reading unit;

a discharged document stacking portion onto which documents are discharged by the document discharge unit;

a drive unit including at least one drive source; and a control unit controlling the drive unit, wherein a first conveying path through which the sheet fed by the sheet feeding unit and discharged by the sheet discharging unit passes and a second conveying path through which the document fed by the document feeding unit and discharged by the document discharging unit passes are connected together, wherein the discharged sheet stacking portion, the document stacking portion and the discharged document stacking portion are provided above the image forming unit in a vertical direction, wherein the discharged sheet stacking portion, the document stacking portion and the discharged document stacking portion are overlapping when viewed in the vertical direction, wherein the control unit sets the image forming unit into the second state in response to executing an image reading mode of reading the image from the document fed from the document feeding unit and discharging the document from which the image is read by the image reading unit, and wherein the control unit sets the image forming unit into the first state in response to executing an image forming mode of forming the image on the sheet fed from the sheet feeding unit and discharging the sheet on which the image is formed by the image forming unit.

12. The image forming apparatus according to claim 11, wherein the control unit sets the image forming unit into the second state by disconnecting a power transmission from the drive unit to the image forming unit.

13. The image forming apparatus according to claim 11, wherein the control unit executes the image forming mode in a state in which the document discharge unit is not driven.

* * * * *